US010131776B2

(12) United States Patent
Sondjaja et al.

(10) Patent No.: US 10,131,776 B2
(45) Date of Patent: *Nov. 20, 2018

(54) COMPOSITION TO IMPROVE COLD FLOW PROPERTIES OF FUEL OILS

(75) Inventors: Ronny Sondjaja, Bandung (ID); Rene Koschabek, Weinheim (DE); Markus Weber, Brensbach (DE); Jane Benito, Bataan (PH); Jian Mike Liu, Singapore (SG); Torsten Stoehr, Frankfurt (DE)

(73) Assignee: EVONIK OIL ADDITIVES GmbH, Darmstadt (DE)

( * ) Notice: Subject to any disclaimer, the term of this patent is extended or adjusted under 35 U.S.C. 154(b) by 845 days.

This patent is subject to a terminal disclaimer.

(21) Appl. No.: 13/395,165

(22) PCT Filed: Jul. 21, 2010

(86) PCT No.: PCT/EP2010/060518
§ 371 (c)(1),
(2), (4) Date: Mar. 9, 2012

(87) PCT Pub. No.: WO2011/035947
PCT Pub. Date: Mar. 31, 2011

(65) Prior Publication Data
US 2012/0174474 A1    Jul. 12, 2012

(30) Foreign Application Priority Data

Sep. 25, 2009  (EP) .................................... 09171400

(51) Int. Cl.
| | | |
|---|---|---|
| *C10L 1/14* | (2006.01) |
| *C08L 33/04* | (2006.01) |
| *C08F 218/08* | (2006.01) |
| *C08F 220/14* | (2006.01) |
| *C08L 31/04* | (2006.01) |
| *C08L 33/08* | (2006.01) |
| *C08L 33/10* | (2006.01) |
| *C10L 10/14* | (2006.01) |
| *C10L 1/19* | (2006.01) |
| *C10L 1/196* | (2006.01) |
| *C10L 1/197* | (2006.01) |

(52) U.S. Cl.
CPC ............ *C08L 33/04* (2013.01); *C08F 218/08* (2013.01); *C08F 220/14* (2013.01); *C08L 31/04* (2013.01); *C08L 33/08* (2013.01); *C08L 33/10* (2013.01); *C10L 1/143* (2013.01); *C10L 1/146* (2013.01); *C10L 10/14* (2013.01); *C10L 1/19* (2013.01); *C10L 1/1963* (2013.01); *C10L 1/1973* (2013.01); *C10L 2200/0476* (2013.01)

(58) Field of Classification Search
CPC .................. C08F 218/08; C08F 220/14; C08F 2220/1891; C08L 31/04; C08L 33/08; C08L 33/10; C08L 33/04; C10L 1/143; C10L 1/146; C10L 1/19; C10L 1/1963; C10L 1/1973; C10L 10/14; C10L 2220/0476

USPC ............................................. 44/395
See application file for complete search history.

(56) References Cited

U.S. PATENT DOCUMENTS

| | | | |
|---|---|---|---|
| 3,869,396 A | 3/1975 | Van De Kraats et al. |
| 4,153,423 A | 5/1979 | Wisotsky |
| 4,608,411 A | 8/1986 | Meunier et al. |
| 4,906,682 A | 3/1990 | Mueller et al. |
| 4,932,980 A | 6/1990 | Mueller et al. |
| 5,178,641 A | 1/1993 | Konrad et al. |
| 5,312,884 A | 5/1994 | Gore et al. |
| 5,743,923 A | 4/1998 | Davies et al. |
| 6,409,778 B1 | 6/2002 | Auschra et al. |
| 6,565,616 B1 | 5/2003 | Krull et al. |
| 7,276,264 B1 | 10/2007 | Moore et al. |
| 7,473,284 B2 | 1/2009 | Krull |
| 8,236,069 B2 | 8/2012 | Martyak et al. |
| 2005/0138859 A1* | 6/2005 | Jackson .................. C10L 1/143 44/389 |
| 2005/0183326 A1 | 8/2005 | Lin et al. |
| 2006/0064568 A1* | 3/2006 | Seto ...................... G06F 3/0605 711/209 |
| 2006/0137242 A1 | 6/2006 | Siggelkow et al. |
| 2006/0240999 A1* | 10/2006 | Placek ................. C10M 145/14 508/469 |
| 2007/0062101 A1 | 3/2007 | Delamotte et al. |
| 2007/0161755 A1 | 7/2007 | Siggelkow et al. |
| 2007/0197409 A1* | 8/2007 | Scherer et al. ............... 508/469 |
| 2008/0178523 A1 | 7/2008 | Ahlers et al. |
| 2009/0064568 A1* | 3/2009 | Stohr ...................... C10L 1/143 44/308 |
| 2009/0282732 A1 | 11/2009 | Ahlers et al. |
| 2010/0048439 A1 | 2/2010 | Maehling et al. |
| 2010/0175310 A1 | 7/2010 | Martyak et al. |
| 2010/0281762 A1 | 11/2010 | Chevrot et al. |
| 2011/0192076 A1 | 8/2011 | Hess et al. |
| 2011/0296743 A1 | 12/2011 | Koschabek et al. |

FOREIGN PATENT DOCUMENTS

| | | | |
|---|---|---|---|
| CA | 2008986 | | 8/1990 |
| CA | 2008986 A | * | 8/1990 |

(Continued)

OTHER PUBLICATIONS

Communication of a notice of opposition issued Nov. 19, 2012 in European Patent Application No. 09171400.6 (with English-language translation).

(Continued)

*Primary Examiner* — Latosha Hines
(74) *Attorney, Agent, or Firm* — Oblon, McClelland, Maier & Neustadt, L.L.P.

(57) ABSTRACT

The present invention describes a composition comprising at least one polyalkyl(meth)acrylate polymer having a number average molecular weight Mn of from 1000 to 10000 g/mol and a polydispersity Mw/Mn of from 1 to 8 and at least one ethylene vinyl acetate copolymer comprising units being derived from at least one alkyl (meth)acrylate having 1 to 30 carbon atoms in the alkyl residue. The composition is useful as cold flow improver in fossil fuel oil and or biodiesel fuel oil.

19 Claims, No Drawings

(56) References Cited

FOREIGN PATENT DOCUMENTS

| | | | | |
|---|---|---|---|---|
| CA | 2008986 A1 | * | 8/1990 | ............ C08L 51/06 |
| CA | 2020571 A1 | | 1/1991 | |
| CA | 2055418 A1 | | 5/1992 | |
| CA | 2 548 008 A1 | | 6/2005 | |
| CA | 2 573 577 A1 | | 7/2007 | |
| CA | 2 573 579 A1 | | 7/2007 | |
| CN | 1245207 A | | 2/2000 | |
| CN | 1875055 A | | 12/2006 | |
| DE | 36 13 247 A1 | | 10/1987 | |
| DE | 37 25 059 A1 | | 2/1989 | |
| DE | 40 36 225 A1 | | 5/1992 | |
| DE | 103 24 102 A1 | | 12/2004 | |
| EP | 0 103 260 A2 | | 3/1984 | |
| EP | 0 384 367 A2 | | 8/1990 | |
| EP | 0 406 684 A1 | | 1/1991 | |
| EP | 0 486 836 A1 | | 5/1992 | |
| EP | 1 391 498 A1 | | 2/2004 | |
| EP | 1 541 663 A1 | | 6/2005 | |
| EP | 1 674 554 | | 6/2006 | |
| EP | 1 808 450 A1 | | 7/2007 | |
| FR | 2 572 410 | | 5/1986 | |
| FR | 2 618 792 | | 2/1989 | |
| GB | 1 112 808 | | 5/1968 | |
| GB | 2207924 A | * | 2/1989 | .......... C08F 255/026 |
| JP | 59-53593 | | 3/1984 | |
| KZ | 15021 B | | 9/2007 | |
| RU | 2 298 564 C2 | | 5/2007 | |
| WO | WO 93/18115 | | 9/1993 | |
| WO | WO 99/27037 | | 6/1999 | |
| WO | WO 01/48032 A1 | | 7/2001 | |
| WO | WO 2004/106470 A1 | | 12/2004 | |
| WO | WO 2005/054314 A2 | | 6/2005 | |
| WO | WO 2006/111326 A1 | | 10/2006 | |
| WO | WO2007/113035 A1 | * | 10/2007 | |
| WO | WO 2007113035 A1 | * | 10/2007 | .............. C10L 1/143 |
| WO | WO 2008/006965 A2 | | 1/2008 | |
| WO | WO 2008/059055 A1 | | 5/2008 | |
| WO | WO 2008/154558 A2 | | 12/2008 | |
| WO | WO 2009/047786 A2 | | 4/2009 | |
| WO | WO 2009/106744 A2 | | 9/2009 | |

OTHER PUBLICATIONS

Walter Caseri, "Pfropfcopolymerisation", RÖMPP Online, Version 3.28, Nov. 6, 2012, pp. 1-3 (with English translation).
U.S. Appl. No. 14/007,589, filed Sep. 25, 2013, Sondjaja, et al.
German Notice of Opposition issued Dec. 4, 2012, in Patent Application No. 09171400.6.
German Notice of Opposition issued Nov. 29, 2012, in Patent Application No. 09 171 400.6 (with English-language translation).
Patrick Beines, "Synthesis of polyacrolein and copolymers by free and controlled radical polymerization", http://www.patrick-beines. de/download/Diplomarbeit—Patrick Beines.pdf, 2004, 97 pages (with English translation).
Dr. Daniela Held, "Molmassenverteilung—wie breit ist breit?" GPC Tipps & Tricks, Laborpraxis, No. 50, Jul./Aug. 2009, p. 49.
European Notice of Opposition issued Dec. 3, 2012, in Patent Application No. 09171400.6 (with English-language translation).
"Supplementary data to table VI, p. 16 of D1", D'1 (Supplementary data relating to table VI, p. 16 of reference AM described on p. 3 in the European Notice of Opposition).
"Quick guide to selecting columns and standards for Gel Permeation Chromatography and Size Exclusion Chromatography", Agilent Technologies, Selection Guide, Dec. 15, 2010, 8 pages.
"GPC From PeakSimple Data Acquisition", GAVILAN1, http://www.srige.com/gpc.pdf, Nov. 13, 2012, 5 pages.
"GPC From PeakSimple Data Acquisition", D'7 (Supplementary document to D7, reference AX described on p. 3 in the European Notice of Opposition).
Russian Certificate of Grant issued Sep. 22, 2014 in Patent Application No. 2012116388/04 (024689) with English Translation.
Combined Taiwanese Office Action and Search Report dated Oct. 16, 2014 in Patent Application No. 099132006 (with English Translation and English Translation of Categories of Cited Documents).
U.S. Appl. No. 14/427,812, filed Mar. 12, 2015, Gokhale, et al.
Decision revoking European Patent No. EP-B-2 305 753 dated Jan. 26, 2015.
Experimental report submitted in EP 2 305 753 B1 on Feb. 27, 2014 by Opponent O3.
Updated version of the Experimental report submitted in EP 2 305 753 B1 on Feb. 27, 2014 submitted on Dec. 3, 2014 by Opponent 3.
Molecular weight distribution of Miravithen, Jun. 2013.
Molecular weight distribution of Flexaren, Jun. 2013.
Additional experimental data, Jun. 2014.
Addititional experimental data updated, Jun. 2014.
Experimental report from P: Synthesis of EVA 28-025-g-behenyl acrylate, Dec. 2014.
EP Letter dated Oct. 9, 2015 in Appeal No. T0687/15-3.3.03 with copy of a letter of the opponent 01 dated Sep. 30, 2015 and English translation of letter of opponent 1 dated Sep. 30, 2015.
EP Letter dated Oct. 14, 2015 in Appeal No. T0687/15-3.3.03 with copy of a letter of the opponent 02 dated Oct. 6, 2015 and English translation of letter of opponent 2 dated Oct. 6, 2015.
EP Letter dated Oct. 23, 2015 in Appeal No. T0687/15-3.3.03 with copy of a letter of the opponent 03 dated Oct. 19, 2015 and English translation of letter of opponent 3 dated Oct. 19, 2015.
Submission of Opponent 2 issued Jun. 22, 2016 in European Patent Application No. 09171400.6 (with English language translation).
Combined Canadian Office Action and Search Report dated Apr. 22, 2016 in Patent Application No. 2,775,380.
International Search Report dated Oct. 22, 2010 in PCT/EP10/60518 Filed Jul. 21, 2010.

* cited by examiner

COMPOSITION TO IMPROVE COLD FLOW PROPERTIES OF FUEL OILS

The present application relates to a composition to improve cold flow properties of fuel oils. Furthermore the present invention describes a use of the present compositions.

Fuels are nowadays generally obtained from fossil sources. However, these resources are limited, so that replacements are being sought. Therefore, interest is rising in renewable raw materials which can be used to produce fuels. A very interesting replacement is in particular biodiesel fuels.

The term biodiesel is in many cases understood to mean a mixture of fatty acid esters, usually fatty acid methyl esters (FAMEs), with chain lengths of the fatty acid fraction of 14 to 24 carbon atoms with 0 to 3 double bonds. The higher the carbon number and the fewer double bonds are present, the higher is the melting point of the FAME. Typical raw materials are vegetable oils (i.e. glycerides) such as rapeseed oils, sunflower oils, soya oils, palm oils, coconut oils and, in isolated cases, even used vegetable oils. These are converted to the corresponding FAMEs by transesterification, usually with methanol under basic catalysis.

The FAME content also affects the cold flow properties of the feedstock. The lower the carbon number and the higher the double bonds are present in the fatty acid chains, the better is the cold flow property of the feedstock. The common methods to evaluate the cold flow quality are: pour point (PP) test as mentioned in ASTM D97, filterability limit via cold filter plugging point (CFPP) test measured to DIN EN 116 or ASTM D6371, and cloud point (CP) test as described in ASTM D2500.

Currently rapeseed oil methyl ester (RME) is the preferred stock for biodiesel production in Europe as rapeseed produces more oil per unit of land area compared to other oil sources. However with the high price level of RME, mixtures of RME with other feedstock, such as soybean (SME) or palm methyl ester (PME), have been exploited as well. In addition to the utilization of 100% biodiesel, mixtures of fossil diesel, i.e. the middle distillate of crude oil distillation, and biodiesel are also of interest owing to the improved low-temperature properties and better combustion characteristics.

In view of the declining ecological quality and decreasing world crude oil reserves, the use of pure biodiesel (B100) has been an important target in many countries. However, many issues, ranging from different combustion characteristic to corrosion of seal materials, have been reported as hindrances to the use of biodiesel as a replacement for fossil diesel. Another major obstacle is the flow behavior of biodiesel at low temperature.

For example, RME has a Cold Filter Plugging Point (CFPP) in the range of −13 to −16° C., which cannot be directly used to meet the winter diesel requirement in Central Europe (i.e. CFPP value of −20° C. or below). The issue is more challenging when feedstocks containing higher amount saturated carbon chains, such as SME, PME or tallow methyl ester (TME), are used either as pure B100 or mixture with RME. Therefore, prior art teaches the use of additives to improve the cold flow properties.

Polyalkyl(meth)acrylates PA(M)A with the presence of M(M)A (e.g. Rohm & Haas Co's patent: U.S. Pat. No. 5,312,884) or without the presence of M(M)A (e.g. Shell Oil's patent: U.S. Pat. No. 3,869,396) as flow improvers for mineral oil have been widely established. The use of hydroxyfunctional-containing PA(M)A as biodiesel cold flow improver (CFI) can also be found in the literature (e.g. RohMax Additives GmbH patent: EP 103260). Also US 2009/0064568 discloses a composition of biodiesel fuel, particularly PME, containing PA(M)A as flow improver.

WO 2009/047786 (Dai-ichi Karkaria Ltd) discloses esterification and polymerization process to synthesize PA(M)A copolymer from alcohol blend containing 1-6% hydrocarbon. The copolymer is used as pour point depressant for fuel oil and biodiesel. WO 2008/154558 (Arkema Inc) discloses the invention of alkyl (meth)acrylic block copolymers or homopolymers, synthesized by a controlled free radical process and the use as cold flow modifiers in biofuels.

Another ingredient widely used as CFI is ethylene vinyl acetate (EVA) copolymer as disclosed in U.S. Pat. No. 5,743,923 (Exxon Chemicals), U.S. Pat. No. 7,276,264 (Clariant GmbH). U.S. Pat. No. 6,565,616 (Clariant GmbH) discloses an additive for improving the cold flow properties containing blend of EVA and copolymers containing maleic anhydride or alkyl acrylates. EP 406684 (Röhm GmbH) discloses a flow improver additive containing mixture of EVA copolymer and PA(M)A.

U.S. Pat. No. 4,932,980 and EP 406684 (both of Röhm GmbH) disclose flow improvers based on a graft polymer consisting of 80-20% EVA copolymer as the backbone and 20-80% alkyl (meth)acrylate as the grafting monomer. US 2007/0161755 (Clariant Ltd) focuses on the use of EVA-graft-(meth)acrylate as flow improvers for mineral and biofuels. The patent (application) also mentions the addition of co-additives.

The known polymers show an acceptable efficiency as cold flow improvers. However, based on the objects mentioned above, a further improvement of the cold flow properties is an enduring challenge. Some of the additives mentioned above improve the cold flow properties at a very specific amount in the fuel oil. However, below or above that very specific amount, the cold flow properties are significant lower. The commercially available fuel oils are standardized in some aspects such as flow properties, combustion behavior and the origin of the fuel oil. However, biodiesel fuel oils are not standardized regarding the composition of the fatty acid esters. Furthermore, recent engines may use fossil fuel oils and biodiesel fuel oils in different amounts. Based on the prices and availability of the fuel oils, the customers usually use fuel oils from different sources comprising diverse cold flow improvers. Therefore, a dilution of the fuel oil additive cannot be avoided such that the efficiency of the additive is lowered. Therefore, although these additives show an acceptable efficiency at very specific contents the overall efficiency should be improved.

Furthermore, some of the additives may have an acceptable efficiency regarding a very special type of fuel oil such as rapeseed oil methyl ester (RME). However, in other fuel oils such as diesel fuel of mineral origin or palm oil methyl ester (PME) these additives show a low performance. As mentioned above, mixing of fuel oils by the customers cannot be avoided. Therefore, the additives should be useful in very different fuel oil compositions.

Furthermore, the additives should be producible in a simple and inexpensive manner, and especially commercially available components should be used. In this context, they should be producible on the industrial scale without new plants or plants of complicated construction being required for this purpose.

These objects and also further objects which are not stated explicitly but are immediately derivable or discernible from the connections discussed herein by way of introduction are achieved by compositions having all features of claim 1. Appropriate modifications to the inventive compositions are protected in the claims referring back to claim 1. With regard to the method, claim 20 provides a solution to the underlying problem.

The present invention accordingly provides a composition comprising
at least one polyalkyl(meth)acrylate polymer having a number average molecular weight Mn of from 1000 to 10000 g/mol and a polydispersity Mw/Mn of from 1 to 8 and
at least one ethylene vinyl acetate copolymer comprising units being derived from at least one alkyl (meth)acrylate having 1 to 30 carbon atoms in the alkyl residue.

The present compositions provide a high efficiency as cold flow improvers over a large concentration range.

At the same time, the inventive polymers allow a series of further advantages to be achieved. These include:
The compositions of the present invention improve the cold flow properties of very different fuel oil compositions. The present additive composition provides outstanding efficiency as cold flow improvers. Furthermore, these improvements are achieved by applying low or high amounts of the composition to the fuel oil. The compositions of the present invention can be prepared in a particularly easy and simple manner. It is possible to use customary industrial scale plants.

The inventive composition comprises at least one polyalkyl(meth)acrylate polymer having a number average molecular weight Mn of from 1000 to 10000 g/mol and a polydispersity Mw/Mn of from 1 to 8.

Polyalkyl(meth)acrylate polymers are polymers comprising units being derived from alkyl(meth)acrylate monomers. The term (meth)acrylates includes methacrylates and acrylates as well as mixtures thereof. These monomers are well known in the art. The alkyl residue of the ester compounds can be linear, cyclic or branched. Usually, the alkyl residue may comprise 1 to 40, preferably 5 to 30 and more preferably 7 to 15 carbon atoms. The monomers can be used individually or as mixtures of different alkyl(meth)acrylate monomers to obtain the polyalkyl(meth)acrylate polymers useful for the present invention. Usually the polyalkyl(meth) acrylate polymers comprise at least 50% by weight, preferably at least 70% by weight and more preferably at least 90% by weight alkyl(meth)acrylate monomers having 7 to 15 carbon atoms in the alkyl residue.

According to a preferred aspect of the present invention, the polyalkyl(meth)acrylate polymers useful for the present invention may comprise units being derived from one or more alkyl(meth)acrylate monomers of formula (I)

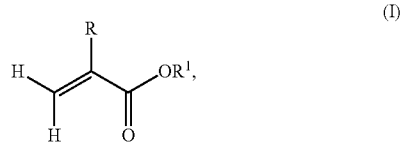

where R is hydrogen or methyl, $R^1$ means a linear, branched or cyclic alkyl residue with 1 to 6 carbon atoms, especially 1 to 5 and preferably 1 to 3 carbon atoms.

Examples of monomers according to formula (I) are, among others, (meth)acrylates which derived from saturated alcohols such as methyl (meth)acrylate, ethyl (meth)acrylate, n-propyl (meth)acrylate, isopropyl (meth)acrylate, n-butyl (meth)acrylate, tert-butyl (meth)acrylate, pentyl (meth)acrylate and hexyl (meth)acrylate; cycloalkyl (meth) acrylates, like cyclopentyl (meth)acrylate and cyclohexyl (meth)acrylate. Preferably, the polymer comprises units being derived from methyl methacrylate.

The polyalkyl(meth)acrylate polymers useful for the present invention may comprise 0 to 40% by weight, preferably 0.1 to 30% by weight, in particular 0.5 to 20% by weight of units derived from one or more alkyl(meth)acrylate monomers of formula (I) based on the total weight of the polymer.

The polyalkyl(meth)acrylate polymer may be obtained preferably by free-radical polymerization. Accordingly the weight fraction of the units of the polyalkyl(meth)acrylate polymer as mentioned in the present application is a result of the weight fractions of corresponding monomers that are used for preparing the inventive polymer.

Preferably, the polyalkyl(meth)acrylate polymer comprises units of one or more alkyl(meth)acrylate monomers of formula (II)

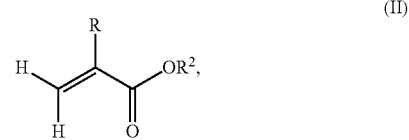

where R is hydrogen or methyl, $R^2$ means a linear, branched or cyclic alkyl residue with 7 to 15 carbon atoms.

Examples of component (II) include (meth)acrylates that derive from saturated alcohols, such as 2-ethylhexyl (meth) acrylate, heptyl (meth)acrylate, 2-tert-butylheptyl (meth) acrylate, n-octyl (meth)acrylate, 3-isopropylheptyl (meth) acrylate, nonyl (meth)acrylate, decyl (meth)acrylate, undecyl (meth)acrylate, 5-methylundecyl (meth)acrylate, n-dodecyl (meth)acrylate, 2-methyldodecyl (meth)acrylate, tridecyl (meth)acrylate, 5-methyltridecyl (meth)acrylate, n-tetradecyl (meth)acrylate, pentadecyl (meth)acrylate; (meth)acrylates which derive from unsaturated alcohols, for example oleyl (meth)acrylate; cycloalkyl (meth)acrylates such as cyclohexyl (meth)acrylate having a ring substituent, like tert-butylcyclohexyl (meth)acrylate and trimethylcyclohexyl (meth)acrylate, bornyl (meth)acrylate and isobornyl (meth)acrylate.

The polyalkyl(meth)acrylate polymer preferably comprises at least 10% by weight, especially at least 20% by weight of units derived from one or more alkyl(meth) acrylates of formula (II), based on the total weight of the polymer. According to a preferred aspect of the present invention, the polymer comprises preferably about 25 to 100% by weight, more preferably about 70 to 99% by weight of units derived from monomers according to formula (II).

Furthermore, the polyalkyl(meth)acrylate polymers useful for the present invention may comprise units being derived from one or more alkyl(meth)acrylate monomers of formula (III)

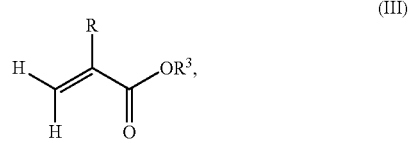

where R is hydrogen or methyl, $R^3$ means a linear, branched or cyclic alkyl residue with 16-40 carbon atoms, preferably 16 to 30 carbon atoms.

Examples of component (III) include (meth)acrylates which derive from saturated alcohols, such as hexadecyl (meth)acrylate, 2-methylhexadecyl (meth)acrylate, heptadecyl (meth)acrylate, 5-isopropylheptadecyl (meth)acrylate, 4-tert-butyloctadecyl (meth)acrylate, 5-ethyloctadecyl (meth)acrylate, 3-isopropyloctadecyl (meth)acrylate, octadecyl (meth)acrylate, nonadecyl (meth)acrylate, eicosyl (meth)acrylate, cetyleicosyl (meth)acrylate, stearyleicosyl (meth)acrylate, docosyl (meth)acrylate and/or eicosyltetratriacontyl (meth)acrylate;

cycloalkyl (meth)acrylates such as 2,4,5-tri-t-butyl-3-vinylcyclohexyl (meth)acrylate, 2,3,4,5-tetra-t-butylcyclohexyl (meth)acrylate.

The polyalkyl(meth)acrylate polymers useful for the present invention may comprise 0 to 40% by weight, preferably 0.1 to 30% by weight, in particular 0.5 to 20% by weight of units derived from one or more alkyl(meth)acrylate monomers of formula (III) based on the total weight of the polymer.

According to a special aspect of the present invention, the weight ratio of ester compounds of the formula (II) which contain 7 to 15 carbon atoms in the alcohol radical to the ester compounds of the formula (III) which contain 16 to 40 carbon atoms in the alcohol radical is preferably in the range of 100:1 to 1:1, more preferably in the range of 50:1 to 2:1, especially preferably 10:1 to 5:1.

The ester compounds with a long-chain alcohol residue, especially monomers according to formulae (II) and (III), can be obtained, for example, by reacting (meth)acrylates and/or the corresponding acids with long chain fatty alcohols, where in general a mixture of esters such as (meth) acrylates with different long chain alcohol residues results. These fatty alcohols include, among others, Oxo Alcohol® 7911 and Oxo Alcohol® 7900, Oxo Alcohol® 1100 (Monsanto); Alphanol® 79 (ICI); Nafol® 1620, Alfol® 610 and Alfol® 810 (Sasol); Epal® 610 and Epal® 810 (Ethyl Corporation); Linevol® 79, Linevol® 911 and Dobanol® 25L (Shell AG); Lial 125 (Sasol); Dehydad® and Dehydad® and Lorol® (Cognis).

The polymer may contain units derived from comonomers as an optional component.

These comonomers include hydroxyalkyl (meth)acrylates like 3-hydroxypropyl (meth)acrylate, 3,4-dihydroxybutyl (meth)acrylate, 2-hydroxyethyl (meth)acrylate, 2-hydroxypropyl (meth)acrylate, 2,5-dimethyl-1,6-hexanediol (meth) acrylate, 1,10-decanediol (meth)acrylate;
aminoalkyl (meth)acrylates and aminoalkyl (meth)acrylamides like N-(3-dimethylaminopropyl)methacrylamide, 3-diethylaminopentyl (meth)acrylate, 3-dibutylaminohexadecyl (meth)acrylate;
nitriles of (meth)acrylic acid and other nitrogen-containing (meth)acrylates like N-(methacryloyloxyethyl) diisobutylketimine, N-(methacryloyloxyethyl)dihexadecylketimine, (meth)acryloylamidoacetonitrile, 2-methacryloyloxyethylmethylcyanamide, cyanomethyl (meth) acrylate;
aryl (meth)acrylates like benzyl (meth)acrylate or phenyl (meth)acrylate, where the acryl residue in each case can be unsubstituted or substituted up to four times;
carbonyl-containing (meth)acrylates like 2-carboxyethyl (meth)acrylate, carboxymethyl (meth)acrylate, oxazolidinylethyl (meth)acrylate, N-methacryloyloxy)formamide, acetonyl (meth)acrylate, N-methacryloylmorpholine, N-methacryloyl-2-pyrrolidinone, N-(2-methyacryloxyoxyethyl)-2-pyrrolidinone, N-(3-methacryloyloxypropyl)-2-pyrrolidinone, N-(2-methyacryloyloxypentadecyl(-2-pyrrolidinone, N-(3-methacryloyloxyheptadecyl-2-pyrrolidinone;
(meth)acrylates of ether alcohols like tetrahydrofurfuryl (meth)acrylate, methoxyethoxyethyl (meth)acrylate, 1-butoxypropyl (meth)acrylate, cyclohexyloxyethyl (meth)acrylate, propoxyethoxyethyl (meth)acrylate, benzyloxyethyl (meth)acrylate, furfuryl (meth)acrylate, 2-butoxyethyl (meth)acrylate, 2-ethoxy-2-ethoxyethyl (meth)acrylate, 2-methoxy-2-ethoxypropyl (meth)acrylate, ethoxylated (meth)acrylates, 1-ethoxybutyl (meth)acrylate, methoxyethyl (meth)acrylate, 2-ethoxy-2-ethoxy-2-ethoxyethyl (meth)acrylate, esters of (meth)acrylic acid and methoxy polyethylene glycols;
(meth)acrylates of halogenated alcohols like 2,3-dibromopropyl (meth)acrylate, 4-bromophenyl (meth)acrylate, 1,3-dichloro-2-propyl (meth)acrylate, 2-bromoethyl (meth) acrylate, 2-iodoethyl (meth)acrylate, chloromethyl (meth) acrylate;
oxiranyl (meth)acrylate like 2,3-epoxybutyl (meth)acrylate, 3,4-epoxybutyl (meth)acrylate, 10,11 epoxyundecyl (meth) acrylate, 2,3-epoxycyclohexyl (meth)acrylate, oxiranyl (meth)acrylates such as 10,11-epoxyhexadecyl (meth)acrylate, glycidyl (meth)acrylate;
phosphorus-, boron- and/or silicon-containing (meth)acrylates like 2-(dimethylphosphato)propyl (meth)acrylate, 2-(ethylphosphito)propyl (meth)acrylate, 2-dimethylphosphinomethyl (meth)acrylate, dimethylphosphonoethyl (meth)acrylate, diethylmethacryloyl phosphonate, dipropylmethacryloyl phosphate, 2-(dibutylphosphono)ethyl (meth) acrylate, 2,3-butylenemethacryloylethyl borate, methyldiethoxymethacryloylethoxysiliane, diethylphosphatoethyl (meth)acrylate;
sulfur-containing (meth)acrylates like ethylsulfinylethyl (meth)acrylate, 4-thiocyanatobutyl (meth)acrylate, ethylsulfonylethyl (meth)acrylate, thiocyanatomethyl (meth)acrylate, methylsulfinylmethyl (meth)acrylate, bis(methacryloyloxyethyl) sulfide;
heterocyclic (meth)acrylates like 2-(1-imidazolyl)ethyl (meth)acrylate, 2-(4-morpholinyl)ethyl (meth)acrylate and 1-(2-methacryloyloxyethyl)-2-pyrrolidone;
maleic acid and maleic acid derivatives such as mono- and diesters of maleic acid, maleic anhydride, methylmaleic anhydride, maleinimide, methylmaleinimide;
fumaric acid and fumaric acid derivatives such as, for example, mono- and diesters of fumaric acid;
vinyl halides such as, for example, vinyl chloride, vinyl fluoride, vinylidene chloride and vinylidene fluoride;
vinyl esters like vinyl acetate;
vinyl monomers containing aromatic groups like styrene, substituted styrenes with an alkyl substituent in the side chain, such as α-methylstyrene and α-ethylstyrene, substituted styrenes with an alkyl substituent on the ring such as vinyltoluene and p-methylstyrene, halogenated styrenes such as monochlorostyrenes, dichlorostyrenes, tribromostyrenes and tetrabromostyrenes;
heterocyclic vinyl compounds like 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles and hydrogenated vinylthiazoles, vinyloxazoles and hydrogenated vinyloxazoles;
vinyl and isoprenyl ethers;
methacrylic acid and acrylic acid.

The comonomers and the ester monomers of the formulae (I), (II) and (III) can each be used individually or as mixtures.

The proportion of comonomers can be varied depending on the use and property profile of the polymer. In general, this proportion may be in the range from 0 to 60% by weight, preferably from 0.01 to 20% by weight and more preferably from 0.1 to 10% by weight. Owing to the combustion properties and for ecological reasons, the proportion of the monomers which comprise aromatic groups, heteroaromatic groups, nitrogen-containing groups, phosphorus-containing groups and sulphur-containing groups should be minimized. The proportion of these monomers can therefore be restricted to 1% by weight, in particular 0.5% by weight and preferably 0.01% by weight.

Preferably, the polyalkyl(meth)acrylate polymer comprises units derived from hydroxyl-containing monomers and/or (meth)acrylates of ether alcohols. According to a preferred aspect of the present invention, the polyalkyl (meth)acrylate polymer preferably comprises 0.1 to 40% by weight, especially 1 to 20% by weight and more preferably 2 to 10% by weight of hydroxyl-containing monomer and/or (meth)acrylates of ether alcohols based on the weight of the polymer. The hydroxyl-containing monomers include hydroxyalkyl (meth)acrylates and vinyl alcohols. These monomers have been disclosed in detail above.

The polyalkyl(meth)acrylate polymers to be used in accordance with the invention have a number average molecular weight $M_n$ in the range of 1000 to 10 000 g/mol, preferably in the range of 2000 to 7000 g/mol and more preferably in the range of 3000 to 6000 g/mol.

The polydispersity $M_w/M_n$ of the polyalkyl(meth)acrylate polymers is in the range from of 1 to 8, preferably from 1.05 to 6.0, more preferably from 1.1 to 5.0 and most preferably from 1.3 to 2.5. The weight average molecular weight $M_w$, the number average molecular weight $M_n$ and the polydispersity $M_w/M_n$ can be determined by GPC using a methyl methacrylate polymer as standard.

The architecture of the polyalkyl(meth)acrylate polymers is not critical for many applications and properties. Accordingly, these polymers may be random copolymers, gradient copolymers, block copolymers and/or graft copolymers. Block copolymers and gradient copolymers can be obtained, for example, by altering the monomer composition discontinuously during the chain growth.

The preparation of the polyalkyl(meth)acrylate polymers from the above-described monomers is known per se. Thus, these polymers can be obtained in particular by free-radical polymerization and related processes, for example ATRP (=Atom Transfer Radical Polymerization), RAFT (=Reversible Addition Fragmentation Chain Transfer) or NMP processes (nitroxide-mediated polymerization). In addition thereto, these polymers are also available by anionic polymerisation.

Customary free-radical polymerization is described, inter alia, in Ullmann's Encyclopedia of Industrial Chemistry, Sixth Edition. In general, a polymerization initiator is used for this purpose. The usable initiators include the azo initiators widely known in the technical field, such as 2,2'-azo-bis-isobutyronitrile (AIBN), 2,2'-azo-bis-(2-methylbutyronitrile) (AMBN) and 1,1-azobiscyclohexanecarbonitrile, and also peroxy compounds such as methyl ethyl ketone peroxide, acetylacetone peroxide, dilauryl peroxide, tert-butyl peroxypivalate, tert-butyl peroxy-2-ethylhexanoate, tert-amyl peroxy-2-ethylhexanoate, ketone peroxide, tert-butyl peroctoate, methyl isobutyl ketone peroxide, cyclohexanone peroxide, dibenzoyl peroxide, tert-butyl peroxybenzoate, tert-butyl peroxyisopropylcarbonate, 2,5-bis (2-ethylhexanoylperoxy)-2,5-dimethylhexane, tert-butyl peroxy-2-ethylhexanoate, tert-butyl peroxy-3,5,5-trimethylhexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide, bis (4-tert-butylcyclohexyl) peroxydicarbonate, mixtures of two or more of the aforementioned compounds with one another, and mixtures of the aforementioned compounds with compounds which have not been mentioned but can likewise form free radicals. Furthermore a chain transfer agents can be used. Suitable chain transfer agents are in particular oil-soluble mercaptans, for example dodecyl mercaptan or 2-mercaptoethanol, or else chain transfer agents from the class of the terpenes, for example terpineols.

Preferably, the polymers can be achieved by using high amounts of initiator and low amounts of chain transfer agents. Especially, the mixture to obtain the polyalkyl(meth) acrylate polymer useful for the present invention may comprise 1 to 15% by weight, preferably 2 to 10% by weight and more preferable 4 to 8% by weight initiator based on the amount of monomers. The amount of chain transfer agents can be used in an amount of 0 to 2% by weight, preferably 0.01 to 1% by weight and more preferable 0.02 to 0.1% by weight based on the amount of monomers.

The ATRP process is known per se. It is assumed that it is a "living" free-radical polymerization, without any intention that this should restrict the description of the mechanism. In these processes, a transition metal compound is reacted with a compound which has a transferable atom group. This transfers the transferable atom group to the transition metal compound, which oxidizes the metal. This reaction forms a radical which adds onto ethylenic groups. However, the transfer of the atom group to the transition metal compound is reversible, so that the atom group is transferred back to the growing polymer chain, which forms a controlled polymerization system. The structure of the polymer, the molecular weight and the molecular weight distribution can be controlled correspondingly. This reaction is described, for example, by J S. Wang, et al., J. Am. Chem. Soc., vol. 117, p. 5614-5615 (1995), by Matyjaszewski, Macromolecules, vol. 28, p. 7901-7910 (1995). In addition, the patent applications WO 96/30421, WO 97/47661, WO 97/18247, WO 98/40415 and WO 99/10387 disclose variants of the ATRP explained above.

Preferably, catalytic chain transfer processes using cobalt (II) chelates complex can be used to prepare the polymers useful for the present invention as disclosed in U.S. Pat. No. 4,694,054 (Du Pont Co) or U.S. Pat. No. 4,526,945 (SCM Co). The documents U.S. Pat. No. 4,694,054 (Du Pont Co) filed with the United States Patent and Trademark Office Jan. 27, 1986 under the Application number 821,321 and U.S. Pat. No. 4,526,945 (SCM Co) filed with the United States Patent and Trademark Office Mar. 21, 1984 under the Application number 591,804 are enclosed herein by reference.

In addition, the inventive polymers may be obtained, for example, also via RAFT methods. This process is presented in detail, for example, in WO 98/01478 and WO 2004/083169, to which reference is made explicitly for the purposes of disclosure.

In addition, the polyalkyl(meth)acrylate polymers are also obtainable by NMP processes (nitroxide-mediated polymerization), which is described, inter alia, in U.S. Pat. No. 4,581,429.

These methods are described comprehensively, in particular with further references, inter alia, in K. Matyjazewski, T.

P. Davis, Handbook of Radical Polymerization, Wiley Interscience, Hoboken 2002, to which reference is made explicitly for the purposes of disclosure.

The anionic polymerisation is well known in the art and described, inter alia, in Ullmann's Encyclopedia of Industrial Chemistry, Sixth Edition. According to a preferred aspect of the present invention, the polyalkyl(meth)acrylate polymer can be obtained according to a method described in U.S. Pat. No. 4,056,559 (Rohm & Haas Co) filed with the United States Patent and Trademark Office Oct. 23, 1974 under the Application number 517,336. The document U.S. Pat. No. 4,056,559 is enclosed herein by reference. Particularly, potassium methoxide solution can be used as initiator.

The polymerization may be carried out at standard pressure, reduced pressure or elevated pressure. The polymerization temperature too is uncritical. However, it is generally in the range of −200° C. to 200° C., especially 0° C. to 190° C., preferably 60° C. to 180° C. and more preferably 120° C. to 170° C. Higher temperatures are especially preferred in free radical polymerizations using high amounts of initiators.

The polymerization may be carried out with or without solvent. The term solvent is to be understood here in a broad sense.

The polymerization is preferably carried out in a nonpolar solvent. These include hydrocarbon solvents, for example aromatic solvents such as toluene, benzene and xylene, saturated hydrocarbons, for example cyclohexane, heptane, octane, nonane, decane, dodecane, which may also be present in branched form. These solvents may be used individually and as a mixture. Particularly preferred solvents are mineral oils, diesel fuels of mineral origin, natural vegetable and animal oils, biodiesel fuels and synthetic oils (e.g. ester oils such as dinonyl adipate), and also mixtures thereof. Among these, very particular preference is given to mineral oils and mineral diesel fuels.

In addition to the polyalkyl(meth)acrylate polymer as described above, the composition of the present invention comprises at least one ethylene vinyl acetate copolymer comprising units being derived from at least one alkyl (meth)acrylate having 1 to 30 carbon atoms in the alkyl residue. As mentioned above, also the polyalkyl(meth)acrylate polymer may comprise units being derived from ethylene and vinyl acetate as comonomers. However, the ethylene vinyl acetate copolymer differs from the polyalkyl(meth)acrylate copolymer. Especially, the amounts of ethylene and/or vinyl acetate in the ethylene vinyl acetate copolymer are higher than in the polyalkyl(meth)acrylate polymer. Therefore the present composition comprises at least two polymers being different in their ethylene and/or vinyl acetate proportion.

Polymers comprising units being derived from ethylene, vinyl acetate and at least one alkyl (meth)acrylate having 1 to 30 carbon atoms in the alkyl residue can be obtained by the polymerisation of corresponding monomer compositions. Ethylene and vinyl acetate are commercially available from a number of suppliers. Alkyl (meth)acrylates having 1 to 30 carbon atoms in the alkyl residue are described above and reference is made thereto.

These ethylene vinyl acetate copolymers may contain 1 to 60 weight %, particularly 5 to 40 weight %, preferably 10 to 20 weight % of units being derived from ethylene based on the total of the repeating units. Particular preference is given to ethylene vinyl acetate copolymers containing preferably 0.5 to 60 weight %, especially 2 to 30 weight % and more preferably 5 to 10 weight % of vinyl acetate based on the total of the repeating units. Preferably, the amount of alkyl (meth)acrylates having 1 to 30 carbon atoms in the alkyl residue is in the range of from 10 weight % to 90 weight %, especially in the range of from 30 to 80 weight % and more preferably in the range of from 60 to 80 weight % based on the total of the repeating units.

According to a special embodiment of the present invention, the ethylene vinyl acetate copolymers preferably comprise from 30 to 90 weight %, more preferably from 60 to 80 weight % of units being derived from at least one alkyl (meth)acrylate having 7 to 15 carbon atoms in the alkyl residue.

Preferably, the molar ratio of ethylene to vinyl acetate of the ethylene vinyl acetate copolymer could be in the range of 100:1 to 1:2, more preferably in the range of 20:1 to 2:1, especially preferably 10:1 to 3:1. The molar ratio of alkyl (meth)acrylates having 1 to 30 carbon atoms in the alkyl residue to vinyl acetate of the ethylene vinyl acetate copolymer is preferably in the range of 50:1 to 1:2, more preferably in the range of 10:1 to 1:1, especially preferably 5:1 to 2:1. Particularly, the molar ratio of ethylene to alkyl (meth)acrylates having 1 to 30 carbon atoms in the alkyl residue of the ethylene vinyl acetate copolymer is preferably in the range of 10:1 to 1:20, more preferably in the range of 2:1 to 1:10, especially preferably 1:1 to 1:5.

In addition to the monomers mentioned above, the ethylene vinyl acetate copolymer may contain further comonomers. These monomers are mentioned above and reference is made thereto. Especially preferred are vinyl esters and olefins. Suitable vinyl esters derive from fatty acids having linear or branched alkyl groups having 2 to 30 carbon atoms. Examples include vinyl propionate, vinyl butyrate, vinyl hexanoate, vinyl heptanoate, vinyl octanoate, vinyl laurate and vinyl stearate, and also esters of vinyl alcohol based on branched fatty acids, such as vinyl isobutyrate, vinyl pivalate, vinyl 2-ethylhexanoate, vinyl isononanoate, vinyl neononanoate, vinyl neodecanoate and vinyl neoundecanoate. Suitable olefins include propene, butene, isobutylene, hexene, 4-methylpentene, octene, diisobutylene and/or norbornene.

Particularly, ethylene vinyl acetate copolymer may comprise from 0 to 20 weight % and more preferably from 1 to 10 weight % of units being derived from comonomers.

The architecture of the ethylene vinyl acetate copolymers is not critical for many applications and properties. Accordingly, the ester-comprising polymers may be random copolymers, gradient copolymers, block copolymers and/or graft copolymers.

According to a special aspect of the present invention, ethylene vinyl acetate copolymers is a graft copolymer having an ethylene vinyl acetate copolymer as graft base and an alkyl (meth)acrylate having 1 to 30 carbon atoms in the alkyl residue as graft layer. Preferably, the weight ratio of graft base to graft layer is in the range of from 1:1 to 1:8 more preferably 1:2 to 1:6.

The ethylene vinyl acetate copolymers to be used in accordance with the invention preferably have a number average molecular weight $M_n$ in the range of 1000 to 120 000 g/mol, especially in the range of 5000 to 90 000 g/mol and more preferably in the range of 20 000 to 70 000 g/mol.

Particularly, the polydispersity $M_w/M_n$ of the ethylene vinyl acetate copolymers may be in the range from of 1 to 8, preferably from 1.05 to 6.0 and most preferably from 1.2 to 5.0. The weight average molecular weight $M_w$, the number average molecular weight $M_n$ and the polydispersity $M_w/M_n$ can be determined by GPC using a methyl methacrylate polymer as standard.

The ethylene vinyl acetate copolymers to be used in accordance with the invention can be prepared by the free radical polymerization method mentioned above and reference is made thereto. Preferably, the ethylene vinyl acetate copolymers can be manufactured according to the method described in EP-A 406684 filed with the European Patent Office Jun. 27, 1990 under the Application number 90112229.1, to which reference is made explicitly for the purposes of disclosure.

According to a preferred aspect of the present invention, the ethylene vinyl acetate copolymer is a graft copolymer having an ethylene vinyl acetate copolymer as graft base. The ethylene vinyl acetate copolymer useful as graft base preferably have a number average molecular weight $M_n$ in the range of 1000 to 100 000 g/mol, especially in the range of 5000 to 80 000 g/mol and more preferably in the range of 10 000 to 50 000 g/mol.

The composition of the present invention comprises at least one ethylene vinyl acetate copolymer and at least one polyalkyl(meth)acrylate polymer. The weight ratio of both polymers may be in a wide range. Preferably, the weight ratio of the polyalkyl(meth)acrylate polymer having a number average molecular weight Mn of from 1000 to 10000 g/mol and a polydispersity Mw/Mn of from 1 to 8 to the ethylene vinyl acetate copolymer comprising units being derived from at least one alkyl (meth)acrylate having 1 to 30 carbon atoms in the alkyl residue is in the range of from 40:1 to 1:10, particularly 20:1 to 1:2, especially 15:1 to 1:1, more preferably 10:1 to 3:1 and most preferably 6:1 to 5:1.

Preferably, the composition according to the present invention can be prepared by mixing the polymers mentioned above. Diluting oil can be used for accomplishing the mixing. Preferred diluting oils have a flash point above 180° C., a pour point below −15° C. (according to ASTM D97) and sulphur content below 50 ppm. Such diluting oils can be achieved by dewaxing a mineral oil. The mixture achieved can be used as an additive composition. Preferably, an additive composition comprises at most 70% by weight, especially 50% by weight and more preferably 30% by weight of diluting oil.

The composition of the present invention is useful for improving the cold flow properties of fuel oil compositions. Usually fuel oil compositions comprise at least 70% by weight, more preferably at least 90% by weight and most preferably at least 98% by weight fuel oil. Useful fuel oils include diesel fuel of mineral origin and biodiesel fuel oil. These fuel oils can be used individually or as mixture.

The fuel composition of the present invention may comprise diesel fuel of mineral origin, i.e. diesel, gas oil or diesel oil. Mineral diesel fuel is widely known per se and is commercially available. This is understood to mean a mixture of different hydrocarbons which is suitable as a fuel for a diesel engine. Diesel can be obtained as a middle distillate, in particular by distillation of crude oil. The main constituents of the diesel fuel preferably include alkanes, cycloalkanes and aromatic hydrocarbons having about 10 to 22 carbon atoms per molecule.

Preferred diesel fuels of mineral origin boil in the range of 120° C. to 450° C., more preferably 170° C. and 390° C. Preference is given to using those middle distillates which contain 0.05% by weight of sulphur and less, more preferably less than 350 ppm of sulphur, in particular less than 200 ppm of sulphur and in special cases less than 50 ppm of sulphur, for example less than 10 ppm of sulphur. They are preferably those middle distillates which have been subjected to refining under hydrogenating conditions, and which therefore contain only small proportions of polyaromatic and polar compounds. They are preferably those middle distillates which have 95% distillation points below 370° C., in particular below 350° C. and in special cases below 330° C. Synthetic fuels, as obtainable, for example, by the Fischer-Tropsch process or gas to liquid processes (GTL), are also suitable as diesel fuels of mineral origin.

The kinematic viscosity of diesel fuels of mineral origin to be used with preference is in the range of 0.5 to 8 mm$^2$/s, more preferably 1 to 5 mm$^2$/s, and especially preferably 1.5 to 3 mm$^2$/s, measured at 40° C. to ASTM D 445.

The fuel compositions of the present invention may comprise at least 20% by weight, in particular at least 30% by weight, preferably at least 50% by weight, more preferably at least 70% by weight and most preferably at least 80% by weight of diesel fuels of mineral origin.

Furthermore, the present fuel composition may comprise at least one biodiesel fuel component. Biodiesel fuel is a substance, especially a oil, which is obtained from vegetable or animal material or both, or a derivative thereof which can be used in principle as a replacement for mineral diesel fuel.

In a preferred embodiment, the biodiesel fuel, which is frequently also referred to as "biodiesel" or "biofuel" comprises fatty acid alkyl esters formed from fatty acids having preferably 6 to 30, more preferably 12 to 24 carbon atoms, and monohydric alcohols having 1 to 4 carbon atoms. In many cases, some of the fatty acids may contain one, two or three double bonds. The monohydric alcohols include in particular methanol, ethanol, propanol and butanol, methanol being preferred.

Examples of oils which derive from animal or vegetable material and which can be used in accordance with the invention are palm oil, rapeseed oil, coriander oil, soya oil, cottonseed oil, sunflower oil, castor oil, olive oil, groundnut oil, corn oil, almond oil, palm kernel oil, coconut oil, mustardseed oil, oils which are derived from animal tallow, especially beef tallow, bone oil, fish oils and used cooking oils. Further examples include oils which derive from cereal, wheat, jute, sesame, rice husks, Jatropha, arachis oil and linseed oil. The fatty acid alkyl esters to be used with preference may be obtained from these oils by processes known in the prior art.

Preference is given in accordance with the invention to highly C16:0/C18:0-glyceride-containing oils, such as palm oils and oils which are derived from animal tallow, and also derivatives thereof, especially the palm oil alkyl esters which are derived from monohydric alcohols. Palm oil (also: palm fat) is obtained from the fruit flesh of the palm fruits. The fruits are sterilized and pressed. Owing to their high carotene content, fruits and oils have an orange-red colour which is removed in the refining. The oil may contain up to 80% C18:0-glyceride.

Particularly suitable biodiesel fuels are lower alkyl esters of fatty acids. Useful examples here are commercial mixtures of the ethyl, propyl, butyl and especially methyl esters of fatty acids having 6 to 30, preferably 12 to 24, more preferably 14 to 22 carbon atoms, for example of caprylic acid, capric acid, lauric acid, myristic acid, palmitic acid, margaric acid, stearic acid, arachic acid, behenic acid, lignoceric acid, cerotic acid, palmitoleic acid, stearic acid, oleic acid, elaidic acid, petroselic acid, ricinoleic acid, elaeostearic acid, linoleic acid, linolenic acid, eicosanoic acid, gadoleic acid, docosanoic acid or erucic acid.

In a particular aspect of the present invention, a biodiesel fuel is used which comprises preferably at least 10% by weight, more preferably at least 30% by weight and most preferably at least 40% by weight of saturated fatty acid esters which are derived from methanol and/or ethanol.

Especially, these esters have at least 16 carbon atoms in the fatty acid radical. These include in particular the esters of palmitic acid and stearic acid.

For reasons of cost, these fatty acid esters are generally used as a mixture. Biodiesel fuels usable in accordance with the invention preferably have an iodine number of at most 150, in particular at most 125, more preferably at most 70 and most preferably at most 60. The iodine number is a measure known per se for the content in a fat or oil of unsaturated compounds, which can be determined to DIN 53241-1. As a result of this, the fuel compositions of the present invention form a particularly low level of deposits in the diesel engines. Moreover, these fuel compositions have particularly high cetane numbers.

In general, the fuel compositions of the present invention may comprise at least 0.5% by weight, in particular at least 3% by weight, preferably at least 5% by weight and more preferably at least 15% by weight of biodiesel fuel. According to a further aspect of the present invention, the fuel compositions of the present invention may comprise at least 80% by weight, more preferably at least 95% by weight of biodiesel fuel.

Preferably, the total amount of at least one polyalkyl (meth)acrylate polymer having a number average molecular weight Mn of from 1000 to 10000 g/mol and a polydispersity Mw/Mn of from 1 to 8 and at least one ethylene vinyl acetate copolymer comprising units being derived from at least one alkyl (meth)acrylate having 1 to 30 carbon atoms in the alkyl residue comprises 0.01 to 5% by weight, especially 0.05 to 1% by weight, preferably 0.1 to 0.5 and more preferably 0.2 to 0.4% by weight of the fuel composition of the present invention.

The inventive fuel composition may comprise further additives in order to achieve specific solutions to problems. These additives include dispersants, for example wax dispersants and dispersants for polar substances, demulsifiers, defoamers, lubricity additives, antioxidants, cetane number improvers, detergents, dyes, corrosion inhibitors and/or odourants.

By virtue of a fuel composition containing at least 20% by weight of diesel fuel of mineral origin, at least 3% by weight biodiesel fuel and from 0.05 to 5% by weight of a composition of the present invention, it is surprisingly possible to provide a fuel composition which, with a property profile which is very similar to that of mineral diesel fuel, comprises a very high proportion of renewable raw materials.

These compositions comprising at least 20% by weight of diesel fuel of mineral origin and at least 3% by weight biodiesel fuel can be used in conventional diesel engines without the seal materials used customarily being attacked.

Furthermore, modern diesel engines can be operated with the fuel of the present invention without the engine control having to be altered.

Preferred fuel compositions consist of
20.0 to 97.95% by weight, in particular 70 to 94.95% by weight, of mineral diesel fuel,
2.0 to 79.95% by weight, in particular 5.0 to 29.95% by weight, of biodiesel fuel,
0.05 to 5% by weight, in particular 0.1 to 1% by weight, of polyalkyl(meth)acrylate polymer and ethylene vinyl acetate copolymer comprising units being derived from at least one alkyl (meth)acrylate having 1 to 30 carbon atoms in the alkyl residue and
0 to 60% by weight, in particular 0.1 to 10% by weight, of additives.

The inventive fuel compositions preferably have an iodine number of at most 30, more preferably at most 20 and most preferably at most 10.

In addition, the inventive fuel compositions have outstanding low-temperature properties. In particular, the pour point (PP) to ASTM D97 preferably has values of less than or equal to 0° C., preferably less than or equal to −5.0° C. and more preferably less than or equal to −10.0° C. The limit of filterability (cold filter plugging point, CFPP) measured to DIN EN 116 is preferably at most 0° C., more preferably at most −5° C. and more preferably at most −10° C. Moreover, the cloud point (CP) to ASTM D2500 of preferred fuel compositions may assume values of less than or equal to 0° C., preferably less than or equal to −5° C. and more preferably less than or equal to −10° C.

The cetane number to DIN 51773 of inventive fuel compositions is preferably at least 50, more preferably at least 53, in particular at least 55 and most preferably at least 58.

The viscosity of the present fuel compositions may be within a wide range, and this feature can be adjusted to the intended use. This adjustment can be effected, for example, by selecting the biodiesel fuels or the mineral diesel fuels. In addition, the viscosity can be varied by the amount and the molecular weight of the ester-comprising polymers used. The kinematic viscosity of preferred fuel compositions of the present invention is in the range of 1 to 10 mm$^2$/s, more preferably 2 to 5 mm$^2$/s and especially preferably 2.5 to 4 mm$^2$/s, measured at 40° C. to ASTM D445.

The use of polyalkyl(meth)acrylate polymer having a number average molecular weight $M_n$ of from 1000 to 10000 g/mol and a polydispersity $M_w/M_n$ of from 1 to 8 and ethylene vinyl acetate copolymer comprising units being derived from at least one alkyl (meth)acrylate having 1 to 30 carbon atoms in the alkyl residue in a concentration of 0.05 to 5% by weight as a flow improver in fuel compositions which comprise diesel fuel of mineral origin and/or biodiesel fuel accordingly provides fuel compositions with exceptional properties.

The invention will be illustrated in detail hereinafter with reference to examples and comparative examples, without any intention that this should impose a restriction. Unless otherwise specified, the percentages are weight percent.

Preparation of PAMA-1

A polyalkyl(meth)acrylate polymer has been prepared using anionic polymerization method as disclosed in U.S. Pat. No. 4,056,559.

A mixture containing 346.50 gram of dodecyl pentadecyl methacrylate (DPMA), 3.50 gram of methyl methacrylate (MMA) and 38.90 gram of dilution oil was charged in 1 L 4-neck reactor under dry nitrogen. The stirred solution was heated to 60° C. 1.75 gram of potassium methoxide solution (32% by weight solution in methanol) was added. The color of the mixture turned to orange. The mixture was further heated up to 93° C. After the temperature reached 75-80° C., the temperature increased to about 110-120° C. by an exothermic reaction. The reaction was hold at 93° C. by stirring the mixture for an additional 3 hours. The mixture was cooled down to 60° C. The PAMA polymer solution containing CH$_3$OK was quenched with acid (for example HCl, acetic acid) to remove essentially all color. The color of the mixture changed from orange to colorless but hazy due to the presence of potassium salt and small amount of water. The solution was stirred for another 30 minutes. Approximately 1% weight of superabsorbent Favor SXM 7500 was added into the polymer mixture; the mixture was stirred for another 10-15 minutes. The polymer solution was purified by using vacuum filter with decalite bed as filter aid. The molecular weight was analyzed via gel permeation chromatography (GPC) in tetrahydrofuran at 35° C. using a polymethyl methacrylate calibration curve composed of a set of at least 12 standards (Polymer Standards Service or Polymer Laboratories), whose $M_{peak}$ was distributed in a logarithmically uniform manner over the range of $1 \times 10^6$ to $2 \times 10^2$ g/mol. A combination of four columns (Polymer Standards SDV 100 Å/2×SDV LXL/SDV 100 Å) was used.

The number average molecular weight was $M_n$=4,000 Da; the weight average molecular weight was $M_w$=6,000 Da and polydispersity index was PDI ($M_w/M_n$)=1.50. In the following the polymer obtained is called PAMA-1.

Preparation of PAMA-2

A polyalkyl(meth)acrylate polymer has been prepared using catalytic chain transfer polymerization method as disclosed in U.S. Pat. No. 4,694,054 or U.S. Pat. No. 4,526,945.

The cobalt (II) chelates complex catalyst bis-(dimethyl-glyoxime borondifluoride)-cobalt (II) was prepared by the method of A. Bakac et al., J. Am. Chem. Soc., 106, 5197-5202 (1984).

A mixture containing 346.50 gram of dodecyl pentadecyl methacrylate (DPMA), 3.50 gram of methyl methacrylate (MMA) and 55 ppm of cobalt (II) complex catalyst was charged in 1 L 4-neck reactor under dry nitrogen. The stirred mixture was heated up to 95° C. 19.25 gram of initiator solution containing 10% benzoyl peroxide solution in THF was introduced to the reactor at constant flow rate 6.1 mL/h over the course of 90 minutes.

After the addition of intiator, the reaction was stirred for another 15 minutes at 75° C. 7 gram of initiator (10% solution) is added. The mixture is stirred for another 3 hours.

The molecular weight was analyzed via gel permeation chromatography (GPC). The number average molecular weight was $M_n$=3,960 Da; the weight average molecular weight was $M_w$=5750 Da and polydispersity index was PDI ($M_w/M_n$)=1.45. In the following the polymer obtained is called PAMA-2.

Preparation of PAMA-3

108.8 gram of dilution oil had been loaded in a 1 L 4-neck reactor under dry nitrogen and stirred at 160° C. A monomer mixture containing 445.5 gram of dodecyl pentadecyl methacrylate (DPMA), 4.5 gram of methyl methacrylate (MMA) and 26.1 gram of di-tert-butyl-peroxide had been prepared. The monomer was fed at 160° C. for 5 hours to the dilution oil. The reaction was held for another 75 minutes at 160° C. The mixture was cooled down the temperature to 110° C. Thereafter, 4.5 gram of dilution oil containing 20% t-butylperoxy-2-ethyl-hexanoate was added over 15 minutes. The mixture was stirred for another 90 minutes at 110° C. The molecular weight was analyzed via gel permeation chromatography (GPC). The number average molecular weight was $M_n$=4,800 Da; the weight average molecular weight was $M_w$=7,640 Da and polydispersity index was PDI ($M_w/M_n$)=1.58. In the following the polymer obtained is called PAMA-3.

Preparation of EVA-1

20 gram of EVA copolymer comprising about 33 weight % vinyl acetate and a number average molecular weight of Mn=47,600 Da (commercially available under the trade name Miravithen 33-025 from Innospec Leuna GmbH) have been solved in 150 gram dilution oil by stirring the mixture at 100° C. overnight. The temperature was adjusted to 90° C. Thereafter 80 gram of dodecyl pentadecyl methacrylate (DPMA) containing 0.5% t-butylperoxy-2-ethyl-hexanoate have been added to the EVA copolymer solution over 3.5 hours. The reaction was maintained by stirring the mixture at 90° C. for another 2 hours. Then 0.2% t-butylperoxy-2-ethyl-hexanoate was added and the mixture was hold for another 45 minutes. The number average molecular weight was $M_n$=53,000 Da; the weight average molecular weight was $M_w$=124,000 Da and polydispersity index was PDI ($M_w/M_n$)=2.33. In the following the polymer obtained is called EVA-1

Preparation of EVA-2

20 gram of EVA copolymer comprising about 28 weight % vinyl acetate and a number average molecular weight of Mn=33,200 Da (commercially available under the trade name Evatane 28-150 from Arkema Inc) have been solved in 150 gram dilution oil by stirring the mixture at 100° C. overnight. The temperature was adjusted to 90° C. Thereafter 20 gram of hexyl octyl decl methacrylate (HODMA) and 60 g of dodecyl tetradecyl hexadecyl methacrylate (LIMA) containing 0.5% t-butylperoxy-2-ethyl-hexanoate have been added to the EVA copolymer solution over 3.5 hours. The reaction was maintained by stirring the mixture at 90° C. for another 2 hours. Then 0.2% t-butylperoxy-2-ethyl-hexanoate was added and the mixture was hold for another 45 minutes. The number average molecular weight was $M_n$=50,400 Da; the weight average molecular weight was $M_w$=111,000 Da and polydispersity index was PDI ($M_w/M_n$)=2.20. In the following the polymer obtained is called EVA-2.

EXAMPLES 1 TO 6 AND COMPARATIVE EXAMPLES 1 TO 7

The polymers obtained according to the Preparation Examples mentioned above had been used to prepare compositions of the present invention. The polymers had been blended by stirring at 60-80° C. for minimum 1 hour. The colourless mixtures had been stable and had been used directly as fuel additives. For the following tests RME (2008/518) from ADM Hamburg AG with CFPP=−14° C. had been used as fuel oil.

The Comparative Example 6 has been performed according to US 2005/0183326. An additive mixture of EVA copolymer containing about 27% by weight of vinyl acetate and dialkyl maleate was used. The additive mixture contained about 30% by weight of dialkyl maleate and 70% by weight of EVA. The molecular weight of the polymer was about Mn=4,350; Mw=9,750 Da; PDI=2.24.

The Comparative Example 7 has been performed according to U.S. Pat. No. 5,743,923. An additive mixture of EVA copolymer containing 33% weight of vinyl acetate and about 10% weight of $C_{16-18}$ phthalimide salt had been used. The molecular weight of the polymer was about Mn=2,200 Da; Mw=8,300 Da; PDI=3.69.

Table 1 describes the improvement of the cold flow properties of RME using the polymers described above. The cold flow properties of the fuel oils comprising different amounts of polymers had been determined according the cold filter plugging point (CFPP) test measured to ASTM D6371.

TABLE 1

| | Additive | Additive treat rate [% by weight] | CFPP [° C.] |
|---|---|---|---|
| Comparative Example 1 | EVA-1 (100%) | 0.10 | −12 |
| | | 0.20 | −14 |
| | | 0.50 | −13 |

TABLE 1-continued

| | Additive | Additive treat rate [% by weight] | CFPP [° C.] |
|---|---|---|---|
| Comparative Example 2 | EVA-2 (100%) | 0.10 | −14 |
| | | 0.25 | −15 |
| | | 0.50 | −15 |
| Comparative Example 3 | PAMA-1 (100%) | 0.10 | −17 |
| | | 0.25 | −21 |
| | | 0.50 | −19 |
| Comparative Example 4 | PAMA-2 (100%) | 0.10 | −17 |
| | | 0.25 | −22 |
| | | 0.50 | −21 |
| Comparative Example 5 | PAMA-3 (100%) | 0.10 | −16 |
| | | 0.25 | −18 |
| | | 0.50 | −21 |
| Comparative Example 6 | EVA (70%) and dialkyl maleate (30%) | 0.10 | −14 |
| | | 0.25 | −20 |
| | | 0.50 | −13 |
| Comparative Example 7 | EVA (90%) and phthalimide salt (10%). | 0.10 | −18 |
| | | 0.25 | −19 |
| | | 0.50 | −13 |
| Example 1 | PAMA-1 (75%) and EVA-1 (25%) | 0.10 | −19 |
| | | 0.25 | −21 |
| | | 0.50 | −21 |
| Example 2 | PAMA-1 (85%) and EVA-1 (15%) | 0.10 | −19 |
| | | 0.25 | −23 |
| | | 0.50 | −23 |
| Example 3 | PAMA-1 (90%) and EVA-1 (10%) | 0.10 | −19 |
| | | 0.25 | −22 |
| | | 0.50 | −22 |
| Example 4 | PAMA-1 (75%) and EVA-2 (25%) | 0.10 | −19 |
| | | 0.25 | −22 |
| | | 0.50 | −21 |
| Example 5 | PAMA-2 (75%) and EVA-1 (25%) | 0.10 | −19 |
| | | 0.25 | −22 |
| | | 0.50 | −23 |
| Example 6 | PAMA-3 (75%) and EVA-1 (25%) | 0.10 | −18 |
| | | 0.25 | −21 |
| | | 0.50 | −22 |

The results clearly showed an obvious advantage of using the new cold flow improvers. The new composition provides a very low cold filter plugging point. The temperature of the cold filter plugging point is much below the temperature of each of the components. Regarding that issue, the EVA-1 used without any coadditive does not provide any improvement at all as shown in Comparative Example 1. The data also showed that the new additives give significant benefit compared to conventional PAMA-based or EVA-based additives. The prior art compositions provide only at very specific concentration an acceptable low temperature performance. Compared to conventional additives, the working treat rate of the new additives is much wider. Furthermore, a high performance can be achieved by using only small amounts of expensive EVA copolymers.

The invention claimed is:

1. A composition, comprising:
at least 90% by weight of the composition of a biodiesel fuel oil; and
from 0.1 to 0.50% by weight of a copolymer mixture, comprising:
i) a polyalkyl(meth)acrylate polymer having a number average molecular weight Mn of from 1000 to 10000 g/mol and a polydispersity Mw/Mn of from 1 to 8; and
ii) an ethylene vinyl acetate copolymer comprising in polymerized form an alkyl (meth)acrylate having 1 to 30 carbon atoms in the alkyl residue;
wherein
the ethylene vinyl acetate copolymer is a graft copolymer comprising an ethylene vinyl acetate copolymer as a graft base and the alkyl (meth)acrylate having 1 to 30 carbon atoms in the alkyl residue as a graft layer;
a weight ratio of the polyalkyl(meth)acrylate polymer i) to the ethylene vinyl acetate copolymer ii) is in the range of from 15:1 to 1:1;
the polyalkyl(meth)acrylate polymer comprises:
(a) 0 to 40% by weight of polymerized units derived from one or more alkyl(meth)acrylate monomers of formula (I):

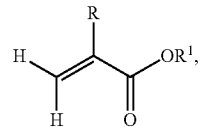

wherein
R is hydrogen or methyl, and
$R^1$ is a linear, branched or cyclic alkyl residue with 1 to 6 carbon atoms,
(b) at least 10% by weight of polymerized units derived from one or more alkyl(meth)acrylate monomers of formula (II):

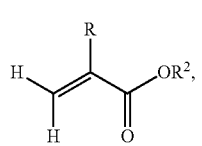

wherein
R is hydrogen or methyl, and
$R^2$ is a linear, branched or cyclic alkyl residue with 7 to 15 carbon atoms, and
(c) 0 to 40% by weight of polymerized units derived from one or more alkyl(meth)acrylate monomers of formula (III):

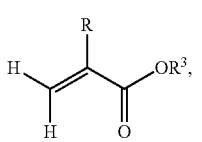

wherein
R is hydrogen or methyl, and
$R^3$ is a linear, branched or cyclic alkyl residue with 16-40 carbon atoms;
the ethylene vinyl acetate copolymer comprises in polymerized form 0.5 to 60 weight % of vinyl acetate; and
the alkyl (meth)acrylate having 1 to 30 carbon atoms in the alkyl residue as the graft layer comprises in polymerized form from 30 to 90 weight % of an alkyl (meth)acrylate having 7 to 15 carbon atoms in the alkyl residue.

2. The composition of claim 1, wherein said polyalkyl (meth)acrylate polymer i) comprises at least 50% by weight of polymerized units derived from the alkyl (meth)acrylate monomers of formula (II).

3. The composition of claim 1, wherein the polydispersity Mw/Mn of said polyalkyl(meth)acrylate polymer i) is in the range of from 1.1 to 5.

4. The composition of claim 1, wherein said polyalkyl (meth)acrylate polymer i) further comprises in polymerized form a hydroxyl-containing monomer, a (meth)acrylate of an ether alcohol, or a mixture thereof.

5. The composition of claim 1, wherein said ethylene vinyl acetate copolymer ii) comprises in polymerized form from 2 to 30 weight % of vinyl acetate.

6. The composition of claim 1, wherein said ethylene vinyl acetate copolymer ii) comprises in polymerized form from 1 to 60 weight % of ethylene.

7. The composition of claim 1, wherein said ethylene vinyl acetate copolymer ii) further comprises in polymerized form up to 20 weight % of at least one additional comonomer.

8. The composition of claim 1, wherein said ethylene vinyl acetate copolymer ii) has a number average molecular weight Mn of from 1000 to 120 000 g/mol.

9. The composition of claim 1, wherein the alkyl (meth)acrylate having 1 to 30 carbon atoms in the alkyl residue as graft layer comprises in polymerized form from 60 to 80 weight % of an alkyl (meth)acrylate having 7 to 15 carbon atoms in the alkyl residue.

10. The composition of claim 1, wherein a weight ratio of graft base to graft layer in said ethylene vinyl acetate copolymer ii) is in the range of from 1:1 to 1:8.

11. The composition of claim 1, further comprising a mineral oil.

12. The composition of claim 1, wherein said biodiesel fuel oil comprises a fatty acid ester derived from a monohydric alcohol having 1 to 4 carbon atoms.

13. The composition of claim 12, wherein said biodiesel oil comprises at least 10% by weight of a fatty acid ester derived from methanol, ethanol, or both, and a saturated fatty acid.

14. The composition of claim 1, wherein the copolymer mixture consists of i) and ii).

15. The composition of claim 1, wherein the polyalkyl (meth)acrylate polymer comprises 0.1 to 30% by weight of polymerized units derived from one or more alkyl(meth)acrylate monomers of formula (I).

16. The composition of claim 1, wherein the polyalkyl (meth)acrylate polymer comprises 25 to 100% by weight of polymerized units derived from one or more alkyl(meth)acrylate monomers of formula (II).

17. The composition of claim 1, wherein the polyalkyl (meth)acrylate polymer comprises 0.1 to 30% by weight of polymerized units derived from one or more alkyl(meth)acrylate monomers of formula (III).

18. The composition of claim 1, wherein the polyalkyl (meth)acrylate polymer comprises:
  0.5 to 20% by weight of polymerized units derived from one or more alkyl(meth)acrylate monomers of formula (I);
  70 to 99% by weight of polymerized units derived from one or more alkyl(meth)acrylate monomers of formula (II); and
  0.5 to 20% by weight of polymerized units derived from one or more alkyl(meth)acrylate monomers of formula (III).

19. The composition of claim 1, which comprises at least 98% by weight of the composition of a biodiesel fuel oil.

* * * * *